United States Patent

Grasso et al.

[11] Patent Number: 5,943,151
[45] Date of Patent: Aug. 24, 1999

[54] MEHTOD OF SELECTIVELY COMPENSATING FOR THE CHROMATIC DISPERSION OF OPTICAL SIGNALS

[75] Inventors: Giorgio Grasso, Monza; Fausto Meli, Piacenza, both of Italy

[73] Assignee: Pirelli Cavi S.p.A., Italy

[21] Appl. No.: 08/807,240

[22] Filed: Feb. 28, 1997

[30] Foreign Application Priority Data

Mar. 11, 1996 [IT] Italy ................................. MI96A0467

[51] Int. Cl.$^6$ ................................................. H04B 10/00
[52] U.S. Cl. ............................................. 359/161; 359/135
[58] Field of Search ........................... 359/124, 127–128, 359/161, 133, 135

[56] References Cited

U.S. PATENT DOCUMENTS

| | | |
|---|---|---|
| 4,953,939 | 9/1990 | Epworth . |
| 5,224,183 | 6/1993 | Dugan ........................................ 385/24 |
| 5,602,666 | 2/1997 | Ishikawa et al. ....................... 359/161 |
| 5,701,188 | 12/1997 | Shigematsu et al. .................. 359/161 |
| 5,754,321 | 5/1998 | Giles et al. .............................. 359/124 |

FOREIGN PATENT DOCUMENTS

559356A1   9/1993   European Pat. Off. ........ H04B 10/16
684709A1   11/1995  European Pat. Off. ........ H04B 10/18

OTHER PUBLICATIONS

Patent Abstracts of Japan, vol. 95, No. 009—Sumitomo—Sep. 1995.

Proceedings of the European Conference on Optical Communication vol. 2, Sep. 1993 pp. 353–356.

*Primary Examiner*—Kinfe-Michael Negash
*Attorney, Agent, or Firm*—Norris, McLaughlin & Morris; L. P. Brooks

[57] ABSTRACT

A method of selectively compensating for the chromatic dispersion of optical signals in an optical telecommunication network, comprising the steps of transmitting at least two signals over a common portion of said network, separating at least one of the signals from the remaining signals at at least one point of the network, compensating for the chromatic dispersion of this signal and recombining said signal with the remaining signals at said one point of the network. Preferably this method further comprises the steps of detecting the chromatic dispersion of each of the signals at at least one point of the network, identifying, among the signals, the signals to be compensated, for which the detected dispersion value does not fall within a range of predetermined values and compensating for the dispersion of said signals so as to make them fall within this range of predetermined values.

23 Claims, 5 Drawing Sheets

MEHTOD OF SELECTIVELY COMPENSATING FOR THE CHROMATIC DISPERSION OF OPTICAL SIGNALS

DESCRIPTION

The present invention relates to an optical telecommunication system providing a selective compensation for the chromatic dispersion, an optical circuit for the selective compensation for the chromatic dispersion of the optical signals propagating along an optical communication line, an optical amplifier including a circuit for the selective compensation for the chromatic dispersion, and a process for transmitting optical signals involving a selective compensation for the chromatic dispersion.

The optical fibres used for signal transmission have a chromatic dispersion due to the combination of the characteristics of the material forming them and the profile characteristics of the refractive index, which chromatic dispersion is varying with the wavelength of the transmitted signals and cancels out at a given value of the wavelength.

This chromatic dispersion phenomenon substantially consists of a duration enlargement of the pulses forming the signal while travelling along the fibre, which enlargement is due to the fact that the different chromatic components in each pulse travel along the fibre at different velocities, each component being characterized by its own wavelength.

As a result of this enlargement, pulses coming successively in time and well distinct at the emission time, can come to being partly overlapped on reception, after travelling over the fibre, to such a point that they are no longer distinguishable as separated entities, thereby causing an error at the reception.

The chromatic dispersion can be reduced by employing as the transmission fibres, the so-called dispersion shifted (DS) fibres or fibres having a shifted cancelling-out point of the chromatic dispersion, in place of the usual step index (or SI) fibres which have a zero dispersion at a wavelength near 1300 nm. Said dispersion-shifted fibres are fibres the optical features of which are such designed that the chromatic dispersion cancelling-out point is brought to a wavelength value ranging between 1500 and 1600 nm, as commonly used for telecommunication.

Fibres of this kind are defined in the ITU-T Recommendation G.653 of March 1993, in which the chromatic dispersion of the fibre is provided to become zero nominally at a wavelength value $\lambda_0$ of 1550 nm, with a tolerance of 50 nm from said value.

DS fibres are described, for example, in patents U.S. Pat. Nos. 4,715,679, 4,822,399, 4,755,022 and are commercialized by CORNING Inc., Corning, N.Y. (US), under the trade name SMF/DS™ and by FIBRE OTTICHE SUD S.p.A., Battipaglia (IT) under the trade name SM DS.

Also with the use of transmission fibres of the DS type, however, it is inevitable for the signals to be submitted to a residual chromatic dispersion in case of propagation over long lengths, on the order of hundreds of kilometers for example, due to the variations along the fibre of the chromatic dispersion cancelling-out wavelength around the nominal value.

In addition to this, in the case of wavelength-division multiplexing (WDM) optical transmissions, in which along the line signals of distinct wavelength are simultaneously transmitted, a positive or negative chromatic dispersion is produced for the signals at wavelengths greater or smaller than the chromatic dispersion cancelling-out wavelength.

One of the proposed techniques for compensating for the chromatic dispersion provides that the fibres that do not have a zero dispersion should be alternated with fibre lengths having dispersion of opposite sign.

U.S. Pat. No. 5,404,413 in the name of Delavaux et al., discloses, among other things, an optical communication system comprising an optical circulator, to a port of which a dispersion compensating waveguide is connected, and reflecting means connected to said dispersion compensating waveguide.

In order to compensate for the chromatic dispersion, the use of a distributed Bragg reflection optical-fibre filter having a chirped grating has been also proposed, for example in an article by F. Ouellette issued on Optics Letters, Vol. 12, No. 10, pages 847–849, of October 1987 and in U.S. Pat. No. 4,953,939 in the name of Epworth, of Sep. 4, 1990.

The Applicant has faced the problem of optical signal transmission in a communication system using add/drop nodes for the signal. Each transmitted optical signal in such a system travels over an optical path included between an add node and a drop node. In general the optical path of each of the signals is independent of the optical paths covered by the remaining signals.

Such a communication system can take the structure of an optical network connecting several stations with each other. By optical network it is herein meant, in general, an assembly of several optical-fibre transmission lines and related stations for interconnecting the transmission lines, also referred to as interchange nodes. In the interchange nodes the optical signals can be routed from one of the transmission lines converging at the node towards one or more of the other transmission lines converging at the node. Add and drop nodes of optical signals to and from the network can be located both along the transmission lines and at the interchange nodes. Some of the transmission lines being part of such an optical network can in particular have a loop structure.

The optical signals introduced into an optical network at an add node can in general follow different paths along the network transmission lines until they reach the drop node where they are directed. The path selection depends not only on the network topology, but also on possible failure conditions in some transmission lines or in some routing nodes, as well as, in general, on the traffic conditions along the network.

A particular example of a communication system having signal add/drop nodes is that of a WDM transmission system between a transmitting station and a receiving station, comprising an optical-fibre line between said stations and intermediate signal add/drop stations, located along the line. The different-wavelength signals issued from a transmission station propagate along an optical fibre, possibly through amplifiers, e.g. of the active optical fibre type, until an intermediate signal add/drop station, which can be configured so that the radiation at some of the signal wavelengths is drawn from the communication line towards appropriate receivers (converting the signals to an electric form, for example), while radiation at one or more of the same wavelengths is introduced into the communication line, downstream of the drop point, which radiation is generally modulated by transmission signals (in an electric form, for example) present at the intermediate station input. The optical radiation leaving the intermediate station is transmitted along another optical fibre length and possibly through other amplifiers and intermediate optical-signal add/drop stations until a receiving station is reached.

Each wavelength constitutes an independent communication channel. The optical telecommunication system can be configured so that it can separately transmit optical signals between pairs of stations included between the terminal stations and those located along the line. It is also possible to transmit independent signals having the same wavelength along lengths devoid of common portions.

In such a communication line there is the possibility of introducing or drawing signals at some of the communication wavelengths, at different points (nodes) along the line, in such a way that they only travel along part of the line extension.

The Applicant has observed that independent optical signals drawn from a drop node of a WDM communication system provided with signal add/drop nodes have, in general, spectral features different from one another and different from the spectral features of the same signals at the add node.

The Applicant has observed that this phenomenon can be explained by the fact that the different signals follow, in general, paths of length and optical features different from each other, in the propagation between the respective add/drop nodes, and that the dispersion built up along these different paths has in general distinct values. The phenomenon is more marked if the transmission lines are comprised of optical fibre lengths of the SI type, but in any case it is also present in transmission systems comprising optical fibres of the DS type.

The Applicant has also tackled the problem of the chromatic dispersion variation undergone by part of the signals propagating along an optical communication network by effect of the variation in the optical paths followed by the signals themselves, due either to failure conditions in some transmission lines or routing nodes, or to variations in the traffic conditions along the network, for example.

The present invention enables the simultaneous compensation for the chromatic dispersion of signals at different wavelengths propagating in an optical WDM communication system to be carried out, even when the chromatic dispersion value is different at each of the wavelengths. The invention is adapted for use either in optical-fibre communication networks, such as those having a mesh or loop structure, or in networks comprising sub-networks of a mesh or loop structure, or in optical communication lines provided with optical-signal add/drop nodes or, in general, in optical communication systems where independent signals can follow optical paths characterized by different dispersion values.

Compensating for the chromatic dispersion means, in the context of the present invention, bringing the dispersion to within such a value range that substantial penalty to the Bit Error Rate (BER) is not caused at the receiver. For example, for digital optical signals having a wavelength of, or near, 1550 nm and a bit rate of 5 Gbit/s, a dispersion near or lower than 1250 ps/nm, in absolute value, is considered as preferred.

The present invention, by compensating for the dispersion effects, makes it possible to simultaneously transmit, at different wavelengths, "local" signals between a transmitting station and a receiving station located in adjacent nodes of a communication network, and "long-line" signals propagating between stations connected with each other through an optical path comprising the fibre lengths joining several nodes in the network, of an overall length of some hundreds or thousands of kilometers, for example.

In addition to the WDM technique, other multiplexing techniques of the optical signals are known, such as the time-division multiplexing (TDM) technique consisting of transmitting portions of the different signals within specific time windows for each of the signals, and in recombining the signals in the receiving phase, based on the information received in the corresponding time windows. The present invention can also be possibly applied in optical communication networks employing this, or other, multiplexing techniques.

According to one aspect, the present invention relates to a method of selectively compensating for the chromatic dispersion of optical signals in an optical telecommunication network, comprising the step of transmitting at least two signals in a common portion of said network, characterized in that it further comprises the following steps:

separating at least one of said signals from the remaining signals in at least one point of said network;

compensating for the chromatic dispersion of said signal;

recombining said signal with the remaining signals in said one point of said network.

Said method preferably comprises the steps of:

detecting the chromatic dispersion of each of said signals in at least one point of said network;

identifying, among those signals, the signals to be compensated, for which the detected dispersion value does not fall within a range of predetermined values;

compensating for the dispersion of said signals to be compensated, so that said dispersion is included within said range of predetermined values.

In one alternative embodiment, said step of detecting the chromatic dispersion comprises:

identifying the optical path of each of said signals, and determining the chromatic dispersion associated with each path.

In a second alternative embodiment, said step of detecting the chromatic dispersion comprises measuring the chromatic dispersion of each of said signals close to said one point in the network.

In an advantageous embodiment of said method, said step of compensating for the chromatic dispersion comprises changing over the path of said signals to be compensated, so that said path will comprise a dispersion compensator.

In a version of said method said signals are of different wavelengths, whereas in another version said signals are time-division multiplexed signals.

Preferably, at least two signals travel over said common portion of said network in one and the same direction.

In particular, said step of compensating for the chromatic dispersion may comprise reflecting said signal by a grating filter of variable pitch.

According to another aspect, the present invention relates to an optical telecommunication system comprising:

means for generating optical signals adapted to generate a first optical signal at a first wavelength and a second optical signal at a second wavelength, distinct from the first wavelength;

an optical-signal transmitting line, along which a first optical path and a second optical path are determined, the former having a first predetermined dispersion at said first wavelength and the latter having a second predetermined dispersion at said second wavelength, and in which said first and second optical paths have one common portion;

means for adding said first optical signal into said first optical path, located at one end of said first optical path, and means for dropping said first optical signal from said first optical path, located at the end of said first optical path opposite to said first end;

means for adding said second optical signal in said second optical path, located at one and of said second optical path, and means for dropping said second optical signal from said second optical path, located at the end of said second optical path opposite to said first end, characterized in that, at a predetermined position along said common portion of said first and second optical paths, said system comprises a device for selectively compensating for the chromatic dispersion, which is adapted to compensate for said first predetermined dispersion at said first wavelength and said second predetermined dispersion at said second wavelength (so that they are comprised within a range of predetermined values).

Said device for selectively compensating for the chromatic dispersion can comprise a first and a second Bragg reflection filter of variable pitch, adapted to reflect said first and second optical signals respectively, and compensate for said first and second predetermined dispersions.

Said device for selectively compensating for the chromatic dispersion can comprise an optical circulator.

Said device for selectively compensating for the chromatic dispersion can comprise a wavelength-selective optical switch, in particular of the acousto-optical type, preferably of a planar type and implemented on a $LiNbO_3$ substrate.

According to a further aspect, the present invention relates to a device for selectively compensating for the chromatic dispersion of optical signals propagating along an optical transmission line, comprising:

an optical circulator, having at least one input port, one intermediate port and one output port;

a Bragg-reflection filter of variable pitch, optically coupled with said intermediate port of said optical circulator, characterized in that it further comprises:

a first selective optical switch adapted to drop at least one of said signals from said optical transmission line and send said signal to said input port of said optical circulator;

a second selective optical switch adapted to add in said optical transmission line a signal from said output port of said optical circulator.

Preferably said first and second optical switches are wavelength-selective switches.

More preferably, said first and second optical switches are included in an acousto-optical device.

More information can be drawn from the following description, with reference to the accompanying drawings, in which.

A device according to the present invention for compensating for the chromatic dispersion of wavelength multiplexed signals will be now described with reference to FIG. 1A.

The device, identified as a whole by reference numeral 25 in the figure, comprises a selective optical switch 7. By selective optical switch it is meant an optical device with one or more inputs and one or more outputs, capable of sending optical signals present at one of the inputs to different outputs, based on the signal features or on appropriate control signals.

A wavelength-selective optical switch 7, adapted for use in the present invention, is provided with two inputs 26, 28 and two outputs 27, 29. The device can be configured, in an independent manner for each wavelength of the input signals, according to at least two configurations identified as bar state and cross state, respectively. In the bar state configuration the signals fed to the inputs 26 and 28 are transmitted to the outputs 27 and 29, respectively. In the cross state configuration, the signals fed to the inputs 26 and 28 are transmitted to the outputs 29 and 27, respectively. By appropriate control signals generated by the control unit 6 connected to the selective optical switch 7, the configuration of the optical switch can be established separately for each of the possible wavelengths of the signals inputted to the optical switch itself.

The device 25 will be described with reference to the exemplary instance of four optical signals fed to the input 26 of the optical switch 7, of wavelengths $\lambda_1$, $\lambda_2$, $\lambda_3$, $\lambda_4$ and chromatic dispersions $d_1$, $d_2$, $d_3$, $d_4$, but it may be provided for a different number of signals of different chromatic dispersions.

The device 25 also comprises an optical circuit 45 for the simultaneous compensation for the chromatic dispersion at different wavelengths.

The optical circuit 45 in turn comprises: an optical circulator 9, a first port 10 of which (input port) is connected by the optical fibre 8 to an output 29 of the wavelength-selective optical switch 7; an optical circuit 30, connected to an intermediate port 11 of the optical circulator 9 and comprising the following elements connected in series with each other: a filter 31 having a selective reflection at the $\lambda_1$ wavelength and capable of supplying a chromatic dispersion $-d_1$ at the reflected radiation, an optical fibre 32, a filter 33 having a selective reflection at the $\lambda_2$ wavelength and capable of supplying a chromatic dispersion $-d_2$ at the reflected radiation, an optical fibre 34, a filter 35 having a selective reflection at the $\lambda_3$ wavelength and capable of supplying a chromatic dispersion $-d_3$ at the reflected radiation, an optical fibre 36 and a filter 37 having a selective reflection at the $\lambda_4$ wavelength and capable of supplying a chromatic dispersion $-d_4$ at the reflected radiation, followed by a low-reflectivity termination 38.

The device 25 may further comprise an optical amplification stage comprising: a dichroic coupler 13, a first input of which is connected to an output port 12 of the optical circulator 9; and an optical pumping source 14, connected to a second input of the dichroic coupler 13 and adapted to supply with pumping radiation an active optical fibre 15 doped with a rare earth element, in particular erbium, connected at one end to one output of the dichroic coupler 13. The opposite end of the active optical fibre 15 is connected to the input 28 of the wavelength-selective optical switch 7.

Operation of the device 25 is as follows.

Fed to the input 26 of the wavelength-selective optical switch 7 are optical signals at wavelengths $\lambda_1$, $\lambda_2$, $\lambda_3$, $\lambda_4$. The optical switch 7 is driven by control signals generated by the control unit 6 in such a manner that it transmits the signals coming from the input 26, at wavelengths $\lambda_1$, $\lambda_2$, $\lambda_3$, $\lambda_4$ to the output 29.

The control signals of the selective optical switch 7 are generated in the control unit 6 based on assessments or measurements of the chromatic dispersion of each optical signal at the input, and optionally based on the structure, features and operative conditions of the communication line or network in which the device 25 operates. In general, the control signals are generated by the control unit 6 so that the signals from the input 26 of the selective optical switch 7 whose chromatic dispersion has to be compensated, are sent to the output 29 of said switch 7, based on the respective wavelengths, and the remaining signals from the input 26 are transmitted to the output 27.

The $\lambda_1, \lambda_2, \lambda_3, \lambda_4$ wavelength signals are transmitted from the output 29 of the switch 7, through the optical fibre 8, to the input port 10 of the optical circulator 9 and therefrom, through the optical circulator, to the intermediate port 11 thereof and subsequently to the optical circuit 30. Signals first reach the selective-reflection filter 31. The $\lambda_1$ wavelength signal is reflected by the filter that simultaneously compensates for the chromatic dispersion $d_1$ of the signal, supplying it with an opposite dispersion.

The $\lambda_2, \lambda_3, \lambda_4$ wavelength signals are transmitted through filter 31 and optical fibre 32, to selective-reflection filter 33 reflecting the $\lambda_2$ wavelength signal so as to compensate for the chromatic dispersion $d_2$ thereof. The $\lambda_3, \lambda_4$ wavelength signals are transmitted through filter 33 and optical fibre 34 to selective reflection filter 35 reflecting the $\lambda_3$ wavelength signal so as to compensate for the chromatic dispersion $d_3$ thereof. The $\lambda_4$ wavelength signal is transmitted through filter 35 and optical fibre 36 to selective reflection filter 37 that reflects it in such a manner as to compensate for the chromatic dispersion $d_4$ thereof. Possible radiation at wavelengths different from $\lambda_1, \lambda_2, \lambda_3, \lambda_4$, transmitted through filter 37, is eliminated from the optical circuit by the low-reflectivity termination 38. The $\lambda_2, \lambda_3, \lambda_4$ wavelength signals reflected by filters 33, 35, 37 travel in the opposite direction over the respective optical paths through optical fibres 36, 34 and 32 and filters 35, 33, 31, being added to the $\lambda_1$ wavelength signal reflected by filter 31 and then reach port 11 of optical circulator 9 and therefrom, through the circulator, the output port 12 thereof. In order to compensate for the signal attenuation due to the optical circulator 9 and optical circuit 30, an amplification stage may be provided which comprises an active fibre 15 fed with pumping radiation supplied from pumping source 14 through dichroic coupler 13. The signals, through the amplification stage, or directly from output 12 of optical circulator 9 in the absence of the amplification stage, reach the input port 28 of the wavelength-selective optical switch and, through the latter, output 27 thereof.

By virtue of the compensation carried out by the device 25, signals have very reduced values of chromatic dispersion.

In the configuration shown, the optical circuit 30 comprises a number of selective-reflection filters 31, 33, 35, 37 equal to the independent wavelengths of the communication signals. Should the signal, at any one or more of such wavelengths, have a sufficiently low dispersion, the optical switch 7 can be driven so as to transmit the corresponding wavelength directly from input 26 to output 27, thereby avoiding the signal passing through optical circulator 9 and optical circuit 30, and possibly omitting the corresponding optical filter in the optical circuit 30. Should for example the $\lambda_4$ wavelength signal have a sufficiently low dispersion, that is enabling a correct reception of said signal, optical filter 37 and related optical fibre 36 can be dispensed with, and low-reflectivity termination 38 can be directly connected to the output of optical filter 35. In this case optical switch 7 can be driven, under operative conditions, so as to selectively transmit all or part of the signals at the three wavelengths $\lambda_1, \lambda_2, \lambda_3$ to output 29 and the remaining signals, the $\lambda_4$ wavelength signal included, to output 27. In this case and in other similar cases, the optical amplifier comprising active fibre 15 may compensate for the greater attenuation undergone by the $\lambda_1, \lambda_2, \lambda_3$ wavelength signals compared with the $\lambda_4$ wavelength signal.

Figure 1A:
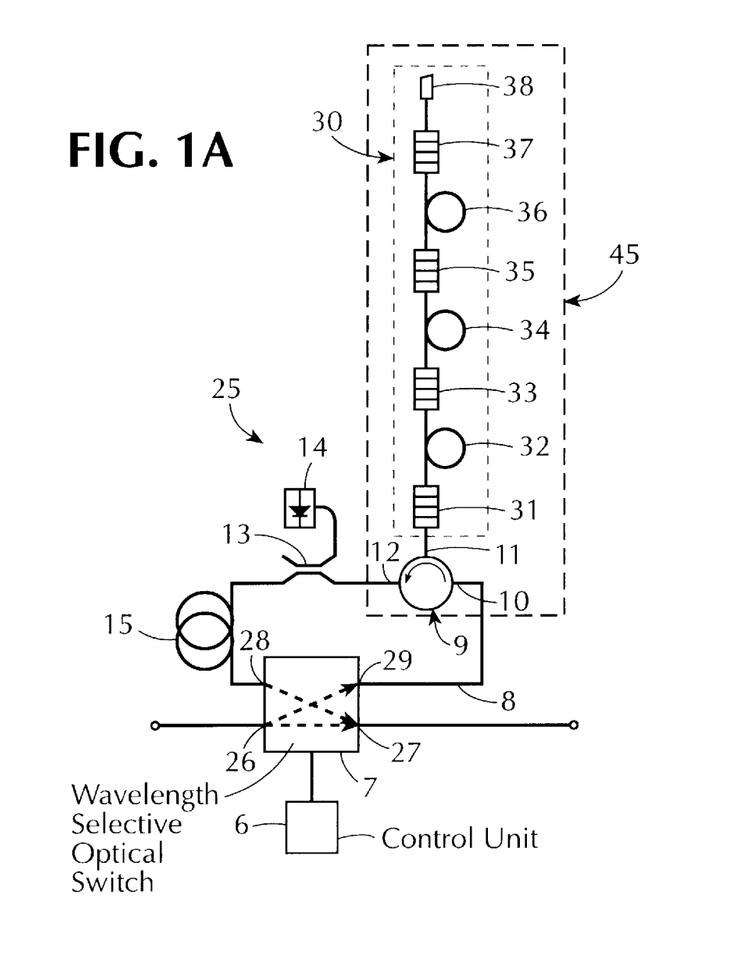
FIGS. 1A–1B show a compensation circuit for the chromatic dispersion according to two alternative configurations of the present invention.
Figure 1B:
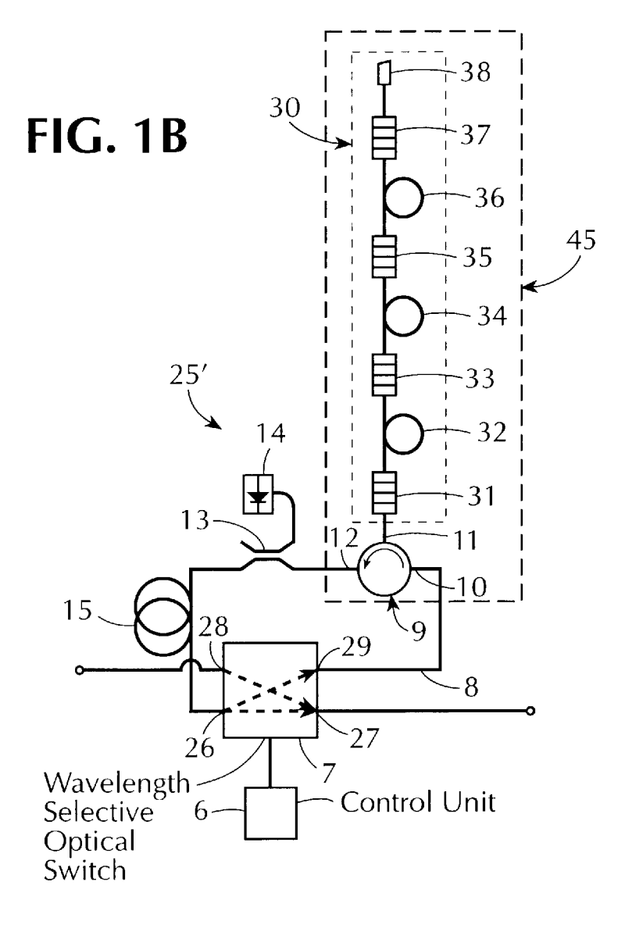

According to an alternative configuration, a device 25' for compensating for the chromatic dispersion can be made according to the diagram shown in FIG. 1B, in which components corresponding to those of the device in FIG. 1A are allocated the same reference numerals.

In device 25', an input 28 of a wavelength-selective optical switch 7 is employed as the input for signals of different wavelengths ($\lambda_1, \lambda_2, \lambda_3, \lambda_4$, in the embodiment shown) and different chromatic dispersions ($d_1, d_2, d_3, d_4$, in the example). Under operative conditions optical switch 7 is driven so as to send to one of its outputs 29, in the bar state configuration, the optical signals from input 28 having a substantially non-zero chromatic dispersion (the $\lambda_1, \lambda_2, \lambda_3, \lambda_4$ wavelength signals, in the example). Said optical signals are sent, in complete analogy with what described with reference to the device in FIG. 1A, through an optical circuit carrying out the simultaneous compensation for the chromatic dispersions at different wavelengths and an amplifying fibre 15, to the remaining input 26 of optical switch 7 and, through the latter, in the bar state configuration, to the remaining output 27 of same, also constituting the output of device 25' for the communication signals.

By the use of device 25', radiation at a wavelength different from the communication signals being possibly present at the device input, due for example to an amplified spontaneous emission coming from the amplification stages located upstream of the device, is sent by optical switch 7 to optical circulator 9 and therefrom to optical circuit 30, transmitted through selective-reflection filters 31, 33, 35, 37 and eliminated through low-reflectivity termination 38, so that it is not reintroduced into the optical communication line when coming out of device 25'.

The alternative configuration of device 25' according to the present invention is advantageous over the configuration in FIG. 1A, for example, in all cases in which the spontaneous emission at the input of the device for chromatic dispersion compensation is higher than the spontaneous emission generated by amplifying fibre 15 (should the latter be present), in that acousto-optical switch 7 can be driven so as to filter the spontaneous emission for the signals in transit.

Advantageously, a selective optical switch 7 is a 2×2 wavelength-selective acousto-optical switch having a response independent of polarization.

Integrate acousto-optical devices are known, the operation of which is based on the interaction between light signals, propagating into waveguides formed on a substrate of birefringent and photoelastic material, and acoustic waves propagating over the substrate surface, generated by appropriate transducers. The interaction between a polarized optical signal and an acoustic wave produces a polarization conversion of the signal, that is a polarization rotation of its mutually orthogonal TE (transverse electric) and TM (transverse magnetic) components.

In such acousto-optical devices, by controlling the acoustic wave frequency it is possible to tune the spectral response curve, which makes said devices adapted to be used as switches in wavelength-division multiplexing optical telecommunication networks. These devices enable the signal selection to be modified without varying wiring of the components. In addition, they enable the simultaneous switching and selection of different signals or channels, if the acoustic wave propagating over the substrate surface is the superposition of different acoustic waves. In fact, switches carry out the combined switching of the signals at the wavelengths corresponding to the frequencies simultaneously applied to the electrodes of the electro-acoustic transducers.

If a channel at a given wavelength is selected, the optical signals at that wavelength entering one input are addressed to the corresponding cross-state output and those entering the other input are addressed to the corresponding other cross-state output (switch in cross-state). Unselected signals are addressed directly from one input to the corresponding output (switch in bar-state).

Figure 2:
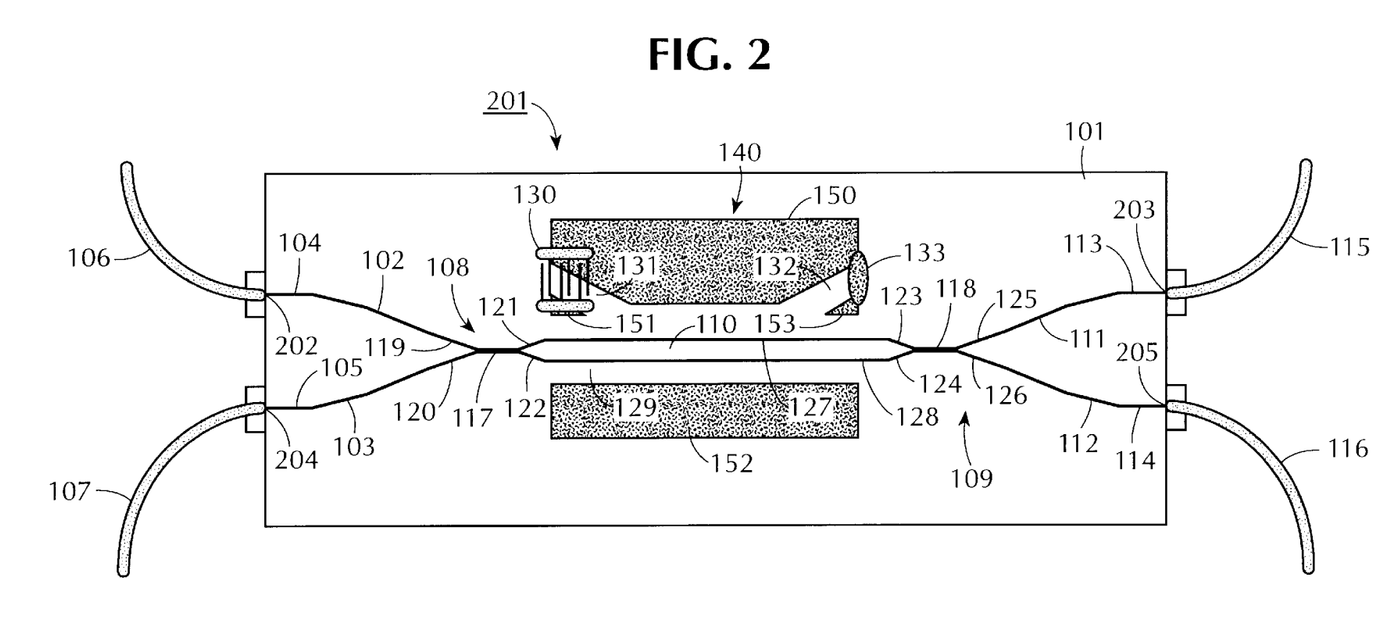
FIG. 2 is a diagram of a wavelength-selective acousto-optical switch.

Shown in FIG. 2 is an acousto-optical switch 201 in one embodiment thereof. It comprises a substrate 101 of birefringent and photoelastic material, consisting of lithium niobate (LiNbO$_3$).

Formed in the substrate 101 are two optical input waveguide branches 102 and 103, the ends of which 104 and 105 carry the two input ports 202, 204, to which respective optical connection fibres 106 and 107 can be connected through known joining devices or "pigtails", diagrammatically shown in the figure.

To enable connection to said optical fibres (with a diameter of about 250 micron), ports 106 and 107 preferably are spaced apart at least 125 $\mu$m from each other.

Also formed in the substrate 101 are two polarization-selective elements 108 and 109, a conversion stage 110 and two optical output waveguide branches 111 and 112, carrying respective output ports 203, 205 at their ends 113, 114, through which respective optical output fibres 115, 116 are connected.

The polarization-selective elements 108 and 109 are preferably formed of polarization splitters, made by means of directional evanescent-wave couplers, adapted to separate, on two output waveguides, two respective polarizations fed to a common input and recombine, in a common output waveguide, two respective polarizations fed to two separate input waveguides, respectively. In particular, each of them is comprised of a central optical waveguide, 117 and 118 respectively, and pairs of optical input and output waveguides, 119, 120, 121, 122 and 123, 124, 125, 126, respectively.

The conversion stage 110 comprises two parallel optical waveguide branches 127 and 128 connected to the pair of output waveguides 121 and 122 of the polarization splitter 108 and to the pair of input waveguides 123 and 124 of the polarization splitter 109. It further comprises an acoustic waveguide 129 containing the optical waveguide branches 127 and 128 and an electro-acoustic transducer 130, formed of a pair of interdigitated electrodes adapted to generate an acoustic radio frequency surface wave.

Conveniently, the transducer 130 is located in an acoustic waveguide 131 communicating with the acoustic waveguide 129, so as to form an acoustic coupler.

At the end of another acoustic waveguide 132, adapted to receive the acoustic signal from the acoustic wave 129, is located a sound absorber 133. The acoustic waveguides 129, 131 and 132 are delimited by areas 150, 151, 152 at which the substrate is doped so as to cause a higher propagation velocity of the acoustic waves than in guides 129, 131 and 132, confining the acoustic signal within the guides.

The assembly formed of electro-acoustic transducer 130, acoustic waveguides 129, 131, 132 and the optical waveguides contained in acoustic waveguide 129, constitutes an acousto-optical converter 140, by which interaction between the acoustic wave and optical signals is carried out.

Operation of the switch shown in FIG. 2 is as follows.

When no voltage is applied to the electro-acoustic transducer 130, the switch is in its off-state and is in a bar-state condition, in which there is a direct correspondence between input ports 202 and 204 and output ports 203 and 205, respectively.

Light signals enter polarization splitter 108 through ports 202 and 204 whereby the TE and TM polarization components are separated in waveguides 121 and 122, travel over branches 127 and 128 of conversion stage 110 in an unchanged state, and are then sent to polarization splitter 109, in which the polarization components are recombined sending the signals to waveguides 125 and 126, so that the signals entering ports 202 and 204 leave ports 203 and 205 unchanged.

By applying an appropriate switching signal to the electrodes of transducer 130, the switch is set into its on-state and passes to the cross-state condition for the selected wavelengths, wherein input ports 202 and 204 are in correspondence with the crossed output ports, 205 and 203 respectively.

To this end transducer 130 generates an acoustic radio frequency surface wave having acoustic drive frequencies $f_{ac}$ (about 174±10 MHz for devices operating near 1550 nm and 210±10 MHz for devices operating near 1300 nm) corresponding to the optical resonance wavelengths at which the polarization conversion TE→TM or TM→TE occurs for one or more predetermined signal wavelengths, for which switching is required.

Light signals enter polarization splitter 108 wherein the TE and TM polarization components are separated and pass through branches 127 and 128 of conversion stage 110 wherein those of the signals at said predetermined wavelengths are converted to the related orthogonal components.

The TE and TM polarization components are then sent to polarization splitter 109 so that the selected polarization components from input port 202 come out of output port 205 together with the unselected components from port 204, and the selected polarization components from input port 204 come out of output port 203 together with the unselected components from port 202.

In this way, those signals that in the conversion stage 110 are submitted to a polarization conversion, are guided in a completely cross-state, producing the function of a complete switching, whereas those that did not interact with the acoustic wave pass unchanged.

Figure 3:
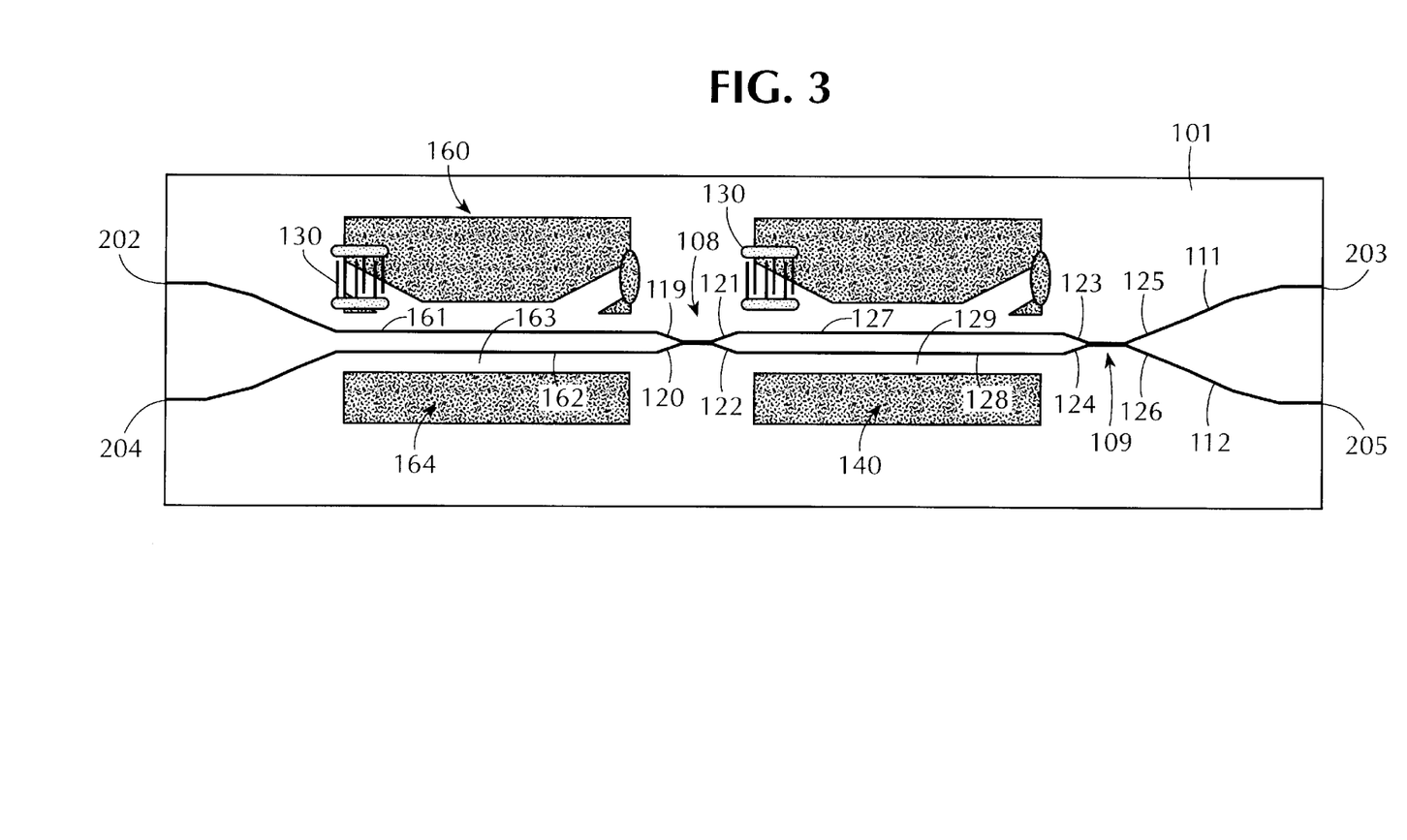
FIG. 3 is an alternative diagram of a wavelength-selective acousto-optical switch.

In a particular embodiment shown in FIG. 3, also formed in the substrate 101 is a compensator 160 comprising two parallel optical waveguide branches 161 and 162, connected at one end to input ports 202 and 204 and at the other end to branches 119, 120 of polarization splitter 108.

The two optical waveguide branches 161 and 162 are contained within the acoustic waveguide 129 of an acoustooptical converter 164, having the same structure as the above described converter 140, the components of which are denoted by the same reference numerals.

In this embodiment, the input signals with the combined TE and TM polarization components travel over branches 161 and 162 of compensator 160 and, when converter 164 is on, are converted into the related orthogonal components, while remaining combined.

Subsequently the signals enter a converter 140 made on the same substrate and similar to that of the device in FIG. 2. The TE and TM polarization components are therein converted again into the original polarization state.

Conveniently, in this embodiment the frequency shifts generated in the two TE and TM components of the signal due to the acousto-optical interaction in the conversion stage are compensated by the opposite shifts taking place in the compensation stage.

The optical circulators are passive optical components, commonly provided with three or four ports in an orderly sequence, unidirectionally transmitting the radiation entering each of the ports towards one alone of the other ports and particularly the adjacent next port in the sequence. The employed circulators preferably are of the type with a response independent of polarization. Optical circulators are commercially available components. Adapted for use in the present invention is model CR1500, manufactured by JDS FITEL Inc., 570 Heston Drive, Nepean, Ontario (CA) or model PIFC-100 manufactured by E-TEK DYNAMICS Inc., 1885 Lundy Ave., San Jose, Calif. (US).

By filter with a selective reflection at the wavelength $\lambda$ of one of the communication signals in an optical wavelength-division multiplexing telecommunication system it is meant an optical component capable of reflecting a major fraction of the radiation of a wavelength included in a predetermined wavelength band and transmitting a major fraction of the radiation of a wavelength external to said predetermined band, wherein said predetermined wavelength band comprises the wavelength $\lambda$ and leaves out the wavelengths of the other communication signals.

The output of the selective-reflection filter 37 (the one located at the farthest distance from the optical circulator) should be suitably terminated, so as to avoid spurious reflections to the optical circulator. For the purpose one of the techniques known to a person of ordinary skill in the art can be adopted, e.g. a termination by means of a low-reflectivity optical angled connector 38. An adapted connector is model FC/APC for example, available from SEIKOH GIKEN, 296-1 Matsuhidai, Matsudo, Chiba (JP).

The optical connections between the different components in the optical circuit of the device can be accomplished by one of the known techniques, by splicing for example. The optical connections between selective-reflection filters 31, 33, 35, 37 and optical fibres 32, 34, 36 can be also made by means of optical connectors, preferably of the low-reflection type, so as to allow an easy addition or removal of filters at different wavelengths.

Alternatively, the assembly of the selective-reflection filters 31, 33, 35, 37 can be made along a single optical fibre portion, by the techniques to be described in the following, either at contiguous positions or leaving distances between the filters corresponding to the length of the optical fibres 32, 34, 36. Said optical fibre portion is then connected to intermediate port 11 of the optical circulator. This alternative solution has the advantage that optical connections between the different optical filters are not required, so that the related attenuations are completely eliminated.

The length of optical fibres 32, 34, 36 can be determined, if necessary, so as to eliminate time correlation between signals at different wavelengths, according to what is described in the Italian patent application IT-M1001536A, filed on Jul. 14, 1995 in the name of the assignee of this application and herein incorporated by reference.

In each of the described solutions, the arrangement order of selective-reflection filters 31, 33, 35, 37 does not represent a critical aspect of the present invention: this order can be modified during the implementation step.

Selective-reflection filters adapted for use in the present invention are optical waveguide filters of the distributed Bragg reflection type. They reflect the radiation in a narrow wavelength band and transmit the radiation externally of said band. They consist of a portion of an optical waveguide, an optical fibre for example, along which an optical parameter, the refractive index for example, exhibits a periodical variation. If the signal portions reflected at each index change are in phase with each other, a constructive interference occurs and the incident signal is reflected. The constructive-interference condition, corresponding to the maximum of the reflection, is expressed by the relation $2 \cdot l = \lambda_s/n$, wherein l stands for the pitch of the grating formed by the refractive index variations, $\lambda_s$ stands for the wavelength of the incident radiation and n stands for the refractive index of the optical-waveguide core. The described phenomenon is known in literature as distributed Bragg reflection.

A periodic variation in the refractive index can be achieved by known techniques, by exposing an optical fibre portion devoid of the protective coating for example, to the interference fringes formed by an intense UV beam (as the one generated by an excimer laser, a frequency-doubled argon laser or a frequency-quadrupled Nd:YAG laser) which is caused to interfere with itself by an appropriate interferometer system by a silicon phase mask for example, as described in U.S. Pat. No. 5,351,321. The fibre and in particular the core are thus exposed to UV radiation of a periodically varying intensity along the optical axis. In the core parts reached by the UV radiation, a partial breaking of the Ge—O bonds occurs which causes a permanent modification in the refractive index.

By selecting the grating pitch so as to verify the constructive-interference relation, the central wavelength of the reflected band can be determined at will.

By this technique, filters can be obtained which have a −3 dB-reflected wavelength band typically of only 0.2–0.3 nm, reflectivity in the centre of the band until near 100%, central wavelength of the reflected band which can be established during the manufacturing step within approximately ±0.1 nm and variation in the central band wavelength with temperature not exceeding 0.02 nm/°C.

Optical fibre filters of the distributed Bragg reflection type having a wider band in reflection can be made by making the grating pitch gradually change, along the extension of said grating, between two values corresponding to the wavelengths delimiting the desired band in reflection.

Optical fibre filters of the distributed Bragg reflection type having a varying grating pitch are known, e.g., from the article by P. C. Hill et al. issued in Electronics Letters, vol. 30, No. 14, Jul. 7, 1994, pages 1172–1174.

The gradual variation of the grating pitch in a distributed Bragg reflection filter can be also employed to make filters capable of compensating for the delay (or advance) of some chromatic components of an optical signal compared with others. For this reason, different-wavelength components of a signal must be reflected by different portions of the same grating, spaced apart by an optical path capable of compensating for said delay or advance.

The chromatic dispersion, that is the delay (or advance) per wavelength unit, of a grating having a pitch varying between two extreme values depends not only on the reflected bandwidth, but also on the grating length, that is, in greater detail, on a quantity corresponding to twice the grating length multiplied by the effective refractive index of the medium in which the grating is made. This quantity corresponds to the difference between the optical paths of the chromatic signal components which are reflected close to the two extremes of the grating itself.

The use of distributed-Bragg-reflection filters to compensate for the chromatic dispersion is for example known from the already mentioned article by F. Ouellette published in Optics Letters or the already mentioned U.S. Pat. No. 4,953,939.

In order to compensate for the chromatic dispersion at the wavelengths of the communication signals, optical fibre filters of the distributed Bragg reflection type having a varying-pitch grating can be used as selective-reflection filters 31, 33, 35, 37.

Each of the filters will have appropriate central wavelength and passband width, so as to reflect the radiation corresponding to one of the communication channels, and dispersion features adapted to compensate for the chromatic dispersion of the corresponding communication channel.

Depending on the use conditions of the device, the filters will be made so as to give the reflected communication signal a chromatic dispersion having the same absolute value as, and opposite sign compared with the (assessed or measured) chromatic dispersion built up by the signal through the fibre lengths travelled over by it, or a chromatic dispersion capable of overcompensating for the dispersion built up by the signal, so that the dispersion becomes zero at a subsequent point of the optical signal path comprising another optical fibre portion.

If the device is intended for use under conditions characterized by significant temperature changes, optical fibre filters 31, 33, 35, 37 may need to be thermally stabilized.

As the dichroic coupler 13, a fused-fibre coupler may be used, made with fibres that are single-mode at 980 nm and in the 1530–1560 wavelength band, with a <0.2 dB variation in output optical power depending on polarization.

Dichroic couplers of the above type are known and commercially available and are manufactured by the above mentioned E-TEK DYNAMICS, for example.

The pump laser 14 can be for example a laser of the Quantum Well type having an emission wavelength $\lambda_p$=980 nm; a maximum optical emission power of about 55 mW is provided.

The active optical fibre 15 is preferably a silica optical fibre. The rare earth element used as the main dopant preferably is erbium. As secondary dopants, aluminium, germanium and lanthanum or aluminium and germanium can be used to advantage.

In a preferred embodiment, in the above described amplification stage an erbium-doped active fibre is used of the type disclosed in detail in the patent application EP 677902 filed in the name of assignee of this application, which is herein incorporated by reference.

The devices described with reference to FIGS. 1A and 1B are adapted for use in compensating for the chromatic dispersion of wavelength-multiplexed optical signals transmitted in an optical communication system. The present invention, however, makes it possible as well to compensate for the chromatic dispersion of signals multiplexed by other different techniques, e.g. by time-division multiplexing (TDM).

The selective optical switch 7 is not intended as limited to the above examples and it generally consists of a demultiplexer adapted to demultiplex input signals to at least two outputs, depending on the signal features (such as wavelength in the case of a WDM transmission, or time position in the case of a TDM transmission) or on suitable control signals, and of a multiplexer adapted to multiplex two or more signals to an output.

The optical circuit selectively compensating for the chromatic dispersion 45 generally comprises means adapted to receive optical signals and compensate for the chromatic dispersion of said signals by a predetermined value, independent for each signal.

An optical amplifier according to the present invention comprising a chromatic dispersion compensation circuit will be now described with reference to FIG. 4.

In said circuit a dichroic coupler 3 feeds the communication signals coming from an input 1 through a first optical isolator 2, and the pumping radiation coming from a first optical pumping source 4 connected with the dichroic coupler 3, to a first length 5 of active optical fibre, doped with a rare earth element, whose output terminates at an input of an optical device 25 for selectively compensating for the chromatic dispersion, of the same type as the one already described with reference to FIG. 1A or FIG. 1B.

An output of optical device 25 terminates at a first input of a dichroic coupler 17, whose second input is fed with the pumping radiation generated by a pumping source 16. An output of dichroic coupler 17 is optically connected to a second length 18 of active optical fibre doped with a rare earth element and terminating, through a second optical isolator 19, at an output 20.

Active optical fibres 5, 18 are preferably of the same type as active optical fibre 15 of the amplification stage of the device described with reference to FIGS. 1A–1B.

The dichroic couplers 3, 17 can be of the same type as coupler 13 shown in FIGS. 1A–1B.

Optical isolators 2, 19 are optical isolators of a type independent of the polarization of the transmission signal, having an isolation greater than 35 dB and a reflectivity lower than −50 dB. Said isolators are for example model MDL I-15 PIPT-A S/N 1016 available from ISOWAVE, 64 Harding Ave., Dover, N.J. (US) or model PIFI 1550 IP02 available from the above mentioned E-TEK DYNAMICS.

Pump sources 4, 16 can be for example lasers of the Quantum Well type with an emission wavelength $\lambda_p$=980 nm. A maximum optical emission power of about 90 mW is provided.

Isolators 2 and 19 located at the input and output of the two stages reduce noise, in particular when due to counter-propagating spontaneous emissions, Rayleigh and Brillouin scattering and the related reflections along the communication line.

In addition to enabling a selective compensation for the chromatic dispersion, an amplifier according to the described example enables the amplified spontaneous emission (ASE) propagating together with the signals to be attenuated. The ASE component coming from input 1 and the one generated in the active fibre length 5 are removed through optical circuit 25 and do not propagate towards the second active fibre length.

Figure 4:
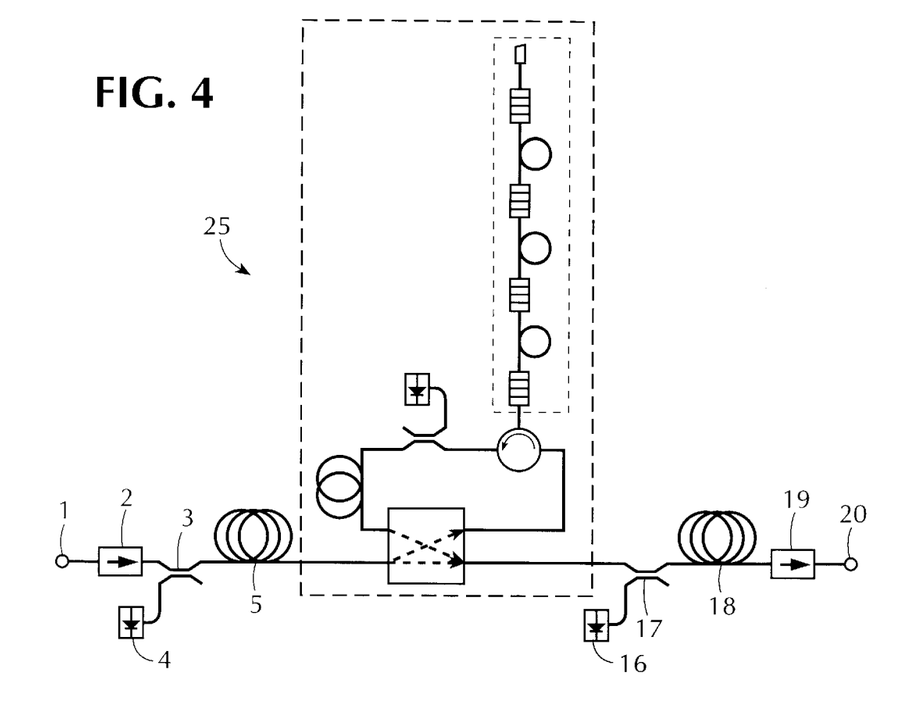
FIG. 4 shows a diagram of an optical amplifier comprising a chromatic dispersion compensating circuit.

While the optical amplifier configuration described with reference to FIG. 4 is preferred, in particular for use as a line amplifier, due to the low noise figure, according to another alternative version of the present invention a device 25 for the chromatic-dispersion compensation is provided to be connected to a single amplification stage, either upstream or downstream, according to the configuration achieved from FIG. 4, omitting respectively the second stage 16, 17, 18 or the first stage 3, 4, 5. This version has a simpler structure and is advantageous, for example, in the case in which said optical amplifier has the function of compensating the attenuation caused by the chromatic-dispersion compensating device 25.

A multichannel wavelength-multiplexing optical communication system in accordance with the present invention will be now described with reference to FIG. 5.

In said optical telecommunication system there are several sources of optical signals, four herein, denoted in the figure by 51a, 51b, 51c, 51d respectively and adapted to emit digital signals at a bit rate of 5 Gbit/s, having wavelengths $\lambda_1$, $\lambda_2$, $\lambda_3$, $\lambda_4$ included in the useful working band of the optical amplifiers located in succession in the system.

Said optical signals are fed to a signal combiner 52 or multiplexer adapted to send the signals at $\lambda_1$, $\lambda_2$, $\lambda_3$, $\lambda_4$ wavelengths to a single optical output fibre 53.

In general, the signal combiner 52 is a passive optical device by which the optical signals transmitted over respective optical fibres are superposed in a single fibre. Devices of this kind consist for example of fused-fibre couplers, planar optics couplers, microoptics couplers and the like. By way of example, an approprate combiner is combiner 1x4 SMTC-0104-1550-A-H available from the above mentioned E-TEK DYNAMICS.

Through fibre 53 said optical signals are sent to a booster 54, increasing the signal power until a sufficient value so that said signals can travel over a subsequent optical fibre length interposed between the booster and other amplifying means, while keeping the required transmissive quality.

Optical signal sources 51a, 51b, 51c, 51d form, together with signal combiner 52, fibre 53 and booster 54, a transmitting station denoted by 90.

Connected to booster 54 is then a first optical line portion 55, usually consisting of a single-mode optical fibre of the SI type, fitted in an appropriate optical cable, of a length of some ten (or hundred) kilometers; for example, with the amplifying means described in the following and the stated power levels, the length is about 100 kilometers.

In some cases optical fibres of the DS type can be also used.

At the end of said first optical line portion 55 a first line amplifier 57 is present which is adapted to receive the signals, attenuated during their travel over the fibre, and to amplify them to such a level as to feed them to a subsequent optical fibre length 65 which can have the same features as fibre 55.

The amplifier is followed by an optical-signal add/drop node 58. In the example shown node 58 draws or drops signals at wavelengths $\lambda_1$ and $\lambda_2$ from the other input signals coming from the line and sends them to receivers 59a and 59b, respectively. At the same time at the output, it adds transmission signals at wavelengths $\lambda_1$ and $\lambda_2$ coming from optical signal sources 60a and 60b to the remaining signals with wavelength $\lambda_3$ and $\lambda_4$.

The optical-signal add/drop node 58 can be made, e.g., with passive components, such as optical-fibre gratings and optical circulators or, in an active version susceptible of reconfiguration, by use of a suitably driven wavelength-selective optical switch, such as an acousto-optical switch of the same type as those described with reference to FIGS. 2 or 3.

The node 58 output is connected to optical fibre 65. Fibre 65 terminates at a line amplifier 67 in turn followed by an optical-signal add/drop node 68 connected to receivers 69a, 69c and optical signal sources 70a, 70c. The features and functions of components 65, 67, 68, 69 and 70 are the same as those of components 55, 57, 58, 59 and 60, respectively, the only difference being that the wavelengths drawn from and respectively added to node 68 along the optical communication line can be different from those drawn from and added to node 58.

In this manner different connections can be made between stations located along the telecommunication system, by utilizing the communication channels corresponding to the different wavelengths in an independent manner. In the example herein described node 68 draws signals at wavelengths $\lambda_1$ and $\lambda_3$ from the other input signals coming from amplifier 67 and sends them to receivers 69a and 69c respectively. At the same time at the output, it adds to the remaining signals of wavelength $\lambda_2$ and $\lambda_4$, transmission signals at wavelength $\lambda_1$ and $\lambda_3$ coming from the optical signal sources 70a and 70c.

The signals at $\lambda_1$, $\lambda_2$, $\lambda_3$, $\lambda_4$ wavelengths propagate from the node 68, along another optical fibre 75 that can be of the same type as fibres 55 and 65, travelling over the required overall transmission distance until they reach a receiving station 80.

The receiving station 80 comprises a pre-amplifier 76 adapted to receive signals and amplify them, compensating for the loss given by the subsequent dispersion-compensating and demultiplexing apparatuses, until a power level adapted to the sensitivity of the receiving devices is reached.

From pre-amplifier 76 signals are sent to a device 125 for selectively compensating for the chromatic dispersion and therefrom to a device adapted to share among several output fibres, the optical signals fed to one input fibre, separating them depending on the respective wavelengths. This device, also named demultiplexer, in the described example consists of a fused-fibre splitter 78, dividing the input signal into signals over several output fibres, four in the example shown, each of said signals being fed, through selective filters not shown in the figure, to respective receivers 79a, 79b, 79c, 79d.

For example, for splitter 78 a component of the same type as the already described signal combiner 52 can be used, but mounted according to an opposite configuration.

The device 125 may comprise, in addition to a dispersion compensating device 25 belonging to one of the types described with reference to FIGS. 1A, 1B, or the like, dispersion compensating means 77 of a traditional type, adapted to give the signals at the different wavelengths a dispersion of the same value. These additional compensating means 77 can, for example, simultaneously give all signals a dispersion of opposite sign and of the same absolute value as the minimum dispersion foreseen for the different signals, in the different operating conditions of the communication system, or of a slightly lower or higher absolute value than this minimum dispersion, in any case adapted to enable a correct reception of the signals having this minimum dispersion value, in the absence of further selective compensation by the device 25, and capable of enabling the selective compensation for the residual dispersion of the remaining signals by device 25.

Other dispersion-compensating devices, similar for example to device 125, can be connected along the telecommunication system, preferably at the line amplifiers 57 and 67, for example in the case in which there are many possible independent signal paths, at at least one of the wavelengths, and the related dispersion values greatly differ from each other, so that the dispersion relating to each path can be no longer compensated for at one of the switching states of a single device 25.

In the example shown, the channel at wavelength $\lambda_1$ is used for transmission from transmitter 51a to receiver 59a and, in an independent manner, from transmitter 60a to receiver 69a and from transmitter 70a to receiver 79a.

The channel at wavelength $\lambda_2$ is used for transmission from transmitter 51b to receiver 59b and, in an independent manner, from transmitter 60b to receiver 79b.

The channel at wavelength $\lambda_3$ is used for transmission from transmitter 51c to receiver 69c and, in an independent manner, from transmitter 70c to receiver 79c.

Finally, the channel at the wavelength $\lambda_4$, is used for transmission from transmitter 51d to receiver 79d.

These paths for the communication channels are to be intended as examples only, since the system is susceptible of reconfiguration, so as to enable the possible different connections between the stations to be carried out using the different communication channels at the different available wavelengths.

In the example, the chromatic dispersion of the signals in the different points of the circuit has been assessed for signals with wavelengths $\lambda_1$=1535 nm, $\lambda_2$=1543 nm, $\lambda_3$=1550 nm, $\lambda_4$=1557 nm. In the absence of compensation, the fibres, of the Step-Index type, have a typical dispersion per unit length of 15 ps/(nm·km) and a maximum dispersion per unit length of 20 ps/(nm·km), at wavelengths near 1550 nm.

The optical fibres 55, 65, 75 considered in the example, each being 100 km long, have a dispersion of about 1500 ps/nm.

The chromatic-dispersion-compensating device 125 comprises a dispersion-compensating fibre 77 of a known type, having a dispersion of about −750 ps/nm at wavelengths $\lambda_1$, $\lambda_2$, $\lambda_3$, $\lambda_4$, to which a device 25 for selectively compensating for dispersion, of the same type as those described with reference to FIG. 1A, is optically connected. It comprises filters 31, 33, 35, 37 having selective reflections at $\lambda_1$, $\lambda_2$, $\lambda_3$, $\lambda_4$ wavelengths respectively, each having a dispersion of about −3000 ps/nm.

The maximum permissible chromatic dispersion, expressed as absolute value, for digital optical signals at wavelength $\lambda$ and bit rate $B_r$ i.e., such as not to cause an significant penalty to the bit error rate (BER) at the receiver (BER$\leq 10^{-9}$), is given by the relation $D_{max}=c/(2-B_r^2 \cdot \lambda^2)$, where c is the velocity of light in vacuum.

If at the receiver a bit error rate (BER) lower than the stated value of $10^{-9}$ is wished, it is generally preferable that the absolute value of the chromatic dispersion be not higher than the quantity $D_{max}/2$.

For signals of wavelengths near 1550 nm and bit rate $B_r$=2.5 Gbit/s, for example, the absolute dispersion value should be lower than about 10000 ps/nm and preferably lower than about 5000 ps/nm. For a bit rate $B_r$=5 Gbit/s, the absolute dispersion value should be lower than about 2500 ps/nm and preferably lower than about 1250 ps/nm.

At the input of receivers 79a, 79b, 79c, 79d a dispersion of 1500 ps/nm, 3000 ps/nm, 1500 ps/nm and 4500 ps/nm has been respectively evaluated for the signals, in the absence of chromatic-dispersion-compensating device 125, which value is higher than the stated limit for the bit rate of 5 Gbit/s.

The device 25 carrying out the selective compensation for the chromatic dispersion is driven so that, by means of selective-reflection filters 33, 37, it compensates for signals at the wavelengths $\lambda_2$, $\lambda_4$, and transmits without compensation signals at the wavelengths $\lambda_1$ and $\lambda_3$.

In the presence of dispersion-compensating device 125 a dispersion of about 750 ps/nm, −750 ps/nm, 750 ps/nm and 750 ps/nm has been assessed for the $\lambda_1$, $\lambda_2$, $\lambda_3$, $\lambda_4$ wavelength signals respectively, in the case of a transmission system operating under the above described conditions. The $\lambda_1$, $\lambda_3$, $\lambda_4$ wavelength signals are therefore undercompensated and the $\lambda_2$ wavelength signal is slightly overcompensated, but each signal is in any case compensated to an extent such to ensure a sufficiently error-free reception.

With reference to the described example, the case is now considered in which the operative configuration of the system is modified by drawing the $\lambda_4$ wavelength signal from the node 68 towards a receiver 69d (not shown) while a signal generated by a transmitter 70d (not shown), also of wavelength $\lambda_4$, is inserted in the same node 68.

The dispersion at receiver 79d of the $\lambda_4$ wavelength signal, that in this case has travelled over the optical fibre length 75 only, is now overcompensated and is of about −2250 ps/nm.

The device 25 carrying out the selective compensation for the chromatic dispersion in this case is driven so as to switch to a different configuration, in which the $\lambda_4$ wavelength signal passes through the device 25 without passing through the selective-reflection filter 37 and therefore without being submitted to another dispersion compensation, in addition to that carried out by compensation means 77. Dispersion of the $\lambda_4$ wavelength signal, after the described switching, is +750 ps/nm and therefore falls within the required limits.

Switching of the device 25 takes place due to the fact that a supervision unit 85 of the telecommunication system signals a variation in the optical configuration of the system itself.

The supervision unit 85 receives from transmission station 90 and add/drop nodes 58, 68, information about node operation in the transmission mode or the add/drop mode respectively, for each of the wavelengths employed in the system. The supervision unit assesses the overall dispersion of the optical paths actually travelled by the signals, based on the above information and the dispersion data of each portion of the optical path (determined when the system is installed) and controls operation of the device 25 so as to selectively compensate for the chromatic dispersion of signals that have taken an optical path corresponding to a dispersion outside the admitted range, so as to bring their dispersion back within this range.

The admitted values can be, for example, those included between $-D_{max}$ and $D_{max}$ and preferably those included between $-D_{max}/2$ and $D_{max}/2$, $D_{max}$ resulting from the previously given formula.

In an alternative configuration thereof, the supervision unit 85 can be connected to an apparatus for directly measuring the chromatic dispersion of the signals inputted to the receivers 79a–d. In this case the supervision unit can, by means of device 25, actuate the selective dispersion-compensation of the signals for which a dispersion value external to the admitted range has been measured.

More important advantages resulting from the selective dispersion-compensation in accordance with the present invention are present at signal bit rates greater than 5 Gbit/s. However, the invention can also be usefully employed at bit rates lower than the 5 Gbit/s of the given example, in particular in those case in which variations in the signal path involve significant variations in the related chromatic dispersion.

Figure 5:
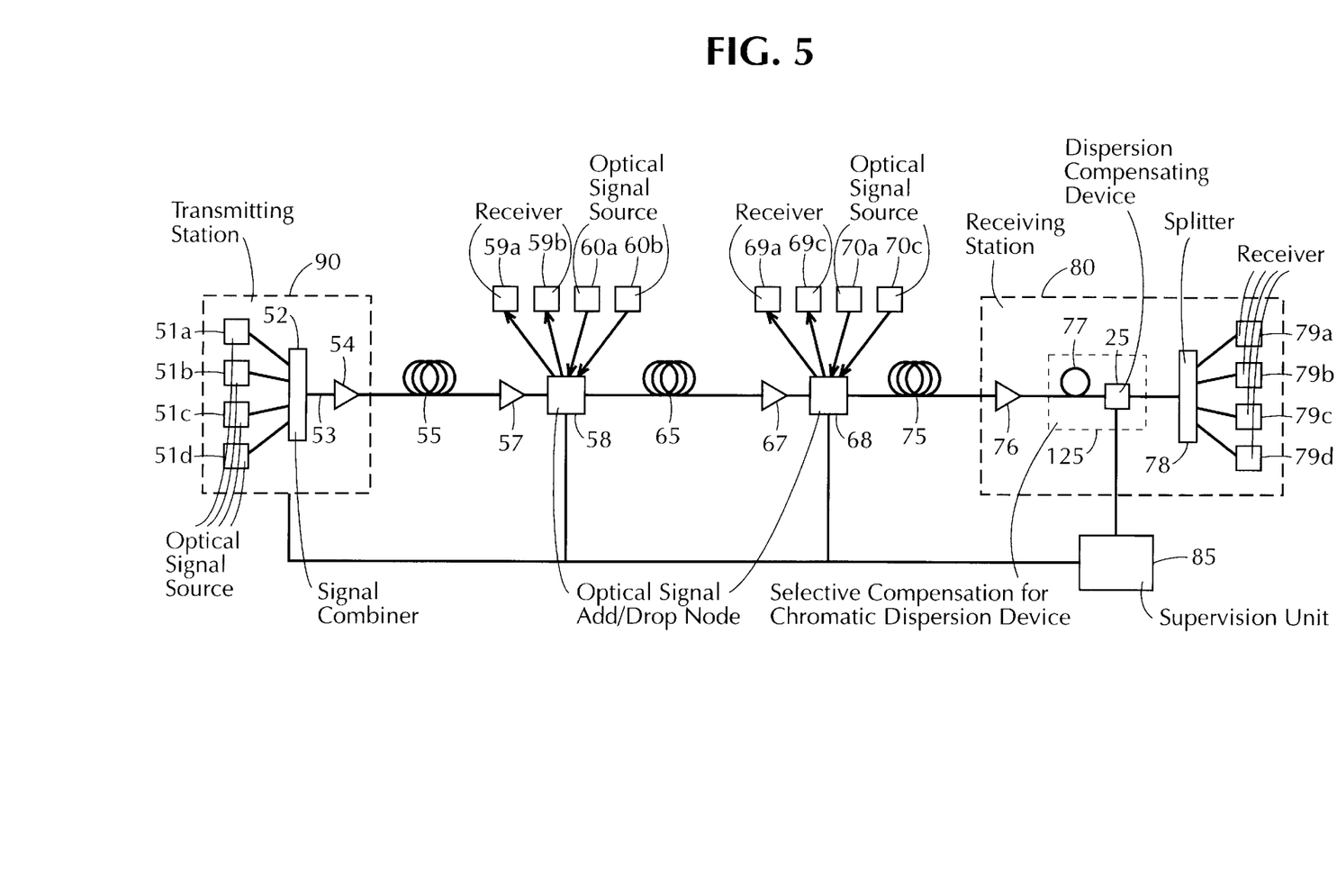
FIG. 5 is a diagram of a multichannel WDM optical communication system.

The configuration described with reference to FIG. 5 is intended as extended also to the case in which the optical signals admitted to the system, at the transmission station 90 or the add/drop nodes 58, 68 are not all generated by local sources but come at least partly from optical transmission lines connected to said transmission station or nodes. These signals at the adding point have dispersion values that are generally different from zero.

Figure 6:
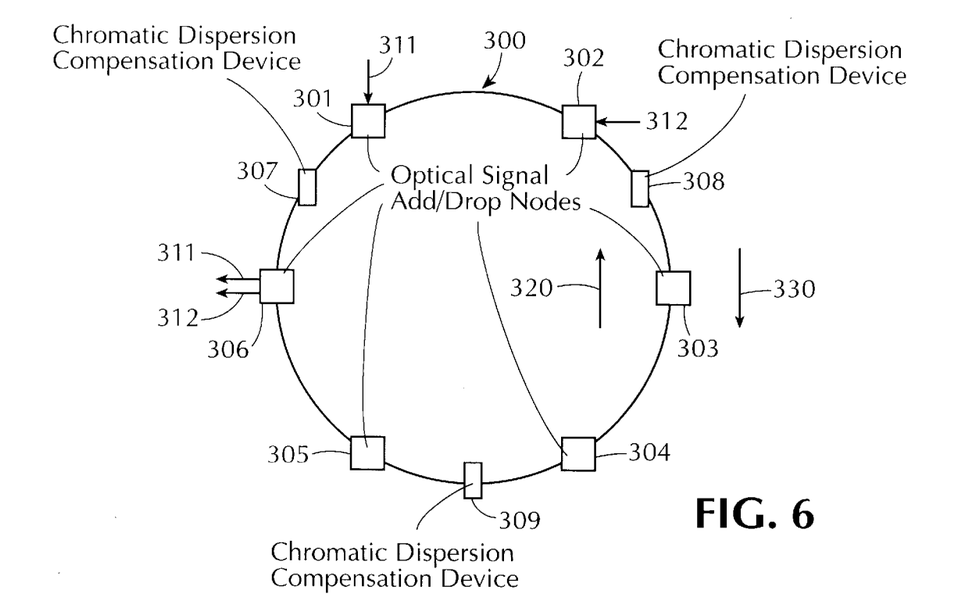
FIG. 6 is a diagram of a communication network comprising add/drop nodes for the signals.

An optical telecommunication network providing a selective compensation for dispersion is diagrammatically shown in FIG. 6.

In said figure signal add/drop nodes 301, 302, 303, 304, 305, 306 are optically linked by optical fibre lengths so as to constitute a loop structure 300.

Such a structure enables temporary breaks in the transmission between two adjacent nodes to be remedied by routing the traffic along the loop in the opposite direction.

A chromatic-dispersion compensating device of one of the previously described types, in accordance with the present invention, is connected between alternated pairs of these nodes. Device 307 is connected between nodes 306 and 301, device 308 is connected between nodes 302 and 303, and device 309 is connected between nodes 304 and 305.

The case has been shown, by way of example, in which a signal 311 of a wavelength $\lambda_1$ is added in node 301, directed to node 306, and a signal 312 of a wavelength $\lambda_2$ is added in node 302, directed to node 306. Signal propagation, during normal operation of the network, takes place in the direction shown by arrow 330. In the absence of devices for compensating for the chromatic dispersion 307–309, the dispersion built up by the signals at the two wavelengths has different values.

If the fibres used for linking the nodes are of the same type and the links are approximately of the same length, as those employed in the telecommunication system described with reference to FIG. 5, the dispersion of the $\lambda_1$ wavelength signal is of about 7500 ps/nm, that of the $\lambda_2$ wavelength signal is of about 6000 ps/nm.

In case of failure in the network, in a portion thereof included between nodes 301 and 306, so that the traffic is routed in the opposite direction along the loop, as shown by arrow 320, the dispersion of the $\lambda_1$ wavelength signal would be approximately 1500 ps/nm, that of the $\lambda_2$ wavelength signal approximately 3000 ps/nm.

In the absence of the dispersion-compensating devices 307–309, the chromatic dispersion overcomes the admitted limits for the bit rate of 5 Gbit/s in each of the two cases.

The chromatic dispersion of the signals can be on the contrary compensated for, if the devices 307, 308, 309 comprise dispersion-compensating means independent of the wavelength, with a dispersion of about –2250 ps/nm at the signal wavelengths, optically connected in series with wavelength-selective dispersion-compensating means comprising selective-reflection filters at the signal wavelengths, each having a dispersion of about –1500 ps/nm.

The devices 307–309 must operate in both the travel directions of the signals.

To this end intrinsically bidirectional devices can be used, which are obtained starting for example from those described with reference to FIG. 1A or 1B, employing a four-port optical circulator instead of the three-port optical circulator and connecting to a fourth port, a succession of selective-reflection and variable-pitch filters of the same type as those connected to the intermediate port of the three-port circulator in the previously described type.

A different dispersion-compensating device can be also used for each of the travelling directions of the signals.

The selective-compensation means present in the device 307 is set in the switching state corresponding to transmission without further compensation, for both wavelengths $\lambda_1$ and $\lambda_2$. In this manner the dispersion built up by the signals when passing through device 307 is –2250 ps/nm, corresponding to a compensation by the wavelength independent compensating means.

The selective-compensation means present in the device 308 is set in the switching state corresponding to transmission without further compensation for the wavelength $\lambda_2$, in the switching state corresponding to a selective compensation of –1500 ps/nm for the wavelength $\lambda_1$. In this manner the dispersion built up by the $\lambda_2$ wavelength signal when passing through the device 308 is –2250 ps/nm, and that built up by the $\lambda_1$ wavelength signal is –3750 ps/nm.

In this manner, the overall dispersion at the receiver (node 306) of the $\lambda_1$ and $\lambda_2$ wavelength signals propagating in the direction of arrow 330 is –750 ps/nm and +750 ps/nm respectively, whereas the dispersion of the signals propagating in the direction of arrow 320 is zero in both cases.

The signal dispersion is therefore effectively compensated for in each path direction.

By suitably controlling the switching state of devices 307, 308, 309 the signal dispersion can be compensated in each travelling direction, also for signals added to or drawn from loop 300 at nodes different from those indicated.

We claim:

1. A method of selectively compensating for the chromatic dispersion of optical signals in an optical telecommunication network, comprising the step of transmitting at least two signals over a common portion of said network, characterized in that the method further comprises the following steps:

identifying at least one of the signals transmitted in the network which requires chromatic dispersion compensation:

separating at least one of said identified signals from the remaining signals at at least one point of said network;

compensating for the chromatic dispersion of said at least one separated signal; and recombining said compensated signal with the remaining signals at said one point of said network.

2. A method of selectively compensating for the chromatic dispersion of optical signals according to claim 1, characterized in that the method comprises the steps of:

detecting the chromatic dispersion of each of said signals at at least one point of said network;

identifying, among those signals, the signals to be compensated, for which the detected dispersion value does not fall within a range of predetermined values; and compensating for the dispersion of said signals to be compensated, so that said dispersion is included within said range of predetermined values.

3. A method of selectively compensating for the chromatic dispersion of optical signals according to claim 2, characterized in that said step of detecting the chromatic dispersion comprises:

identifying the optical path of each of said signals, and determining the chromatic dispersion associated with each path.

4. A method of selectively compensating for the chromatic dispersion of optical signals according to claim 2, characterized in that said step of detecting the chromatic dispersion comprises measuring the chromatic dispersion of each of said signals close to said one point in the network.

5. A method of selectively compensating for the chromatic dispersion of optical signals according to claim 2, characterized in that said step of compensating for the chromatic dispersion comprises switching the path of said signals to be compensated, so that said path will comprise a dispersion compensator.

6. A method of selectively compensating for the chromatic dispersion of optical signals according to claim 1, characterized in that said signals are of different wavelengths.

7. A method of selectively compensating for the chromatic dispersion of optical signals according to claim 1, characterized in that said signals are time-division multiplexed signals.

8. A method of selectively compensating for the chromatic dispersion of optical signals according to claim 1, characterized in that said at least two signals travel over said common portion of said network in one and the same direction.

9. A method of selectively compensating for the chromatic dispersion of optical signals according to claim 1, characterized in that said step of compensating for the chromatic dispersion comprises reflecting said signal by a grating filter of variable pitch.

10. An optical telecommunication system comprising:

means for generating optical signals adapted to generate a first optical signal at a first wavelength and a second optical signal at a second wavelength, distinct from the first wavelength;

an optical-signal transmitting line, along which a first optical path and a second optical path are determined, the former having a first predetermined dispersion at said first wavelength and the latter having a second predetermined dispersion at said second wavelength, and in which said first and second optical paths have one common portion;

means for adding said first optical signal in said first optical path, located at one end of said first optical path, and means for dropping said first optical signal from said first optical path, located at the end of said first optical path opposite to said first end; and means for adding said second optical signal in said second optical path, located at one end of said second optical path, and means for dropping said second optical signal from said second optical path, located at the end of said second optical path opposite to said first end, characterized in that, at a predetermined position along said common portion of said first and second optical paths, said system comprises a device for selectively compensating for the chromatic dispersion, which is adapted to compensate for said first predetermined dispersion at said first wavelength and said second predetermined dispersion at said second wavelength.

11. An optical telecommunication system according to claim 10, characterized in that said device for selectively compensating for the chromatic dispersion comprises a first and a second Bragg reflection filter of variable pitch, adapted to reflect said first and second optical signals respectively, and compensate for said first and second predetermined dispersions.

12. An optical telecommunication system according to claim 10, characterized in that said device for selectively compensating for the chromatic dispersion comprises an optical circulator.

13. An optical telecommunication system according to claim 10, characterized in that said device for selectively compensating for the chromatic dispersion comprises a wavelength-selective optical switch.

14. An optical telecommunication system according to claim 13, characterized in that said wavelength-selective optical switch is of an acousto-optical type.

15. An optical telecommunication system according to claim 14, characterized in that said wavelength-selective optical switch is of a planar type and implemented on a LiNbO$_3$ substrate.

16. A device for selectively compensating for the chromatic dispersion of optical signals propagating along an optical transmission line, comprising:

an optical circulator, having at least one input port, one intermediate port and one output port;

a Bragg-reflection filter of variable pitch, optically coupled with said intermediate port of said optical circulator, characterized in that the device further comprises:

a first selective optical switch adapted to drop at least one of said signals from said optical transmission line and send said signal to said input port of said optical circulator; and a second selective optical switch adapted to add in said optical transmission line, a signal from said output port of said optical circulator.

17. A device for selectively compensating for the chromatic dispersion of optical signals according to claim 16, characterized in that said first and second optical switches are wavelength-selective switches.

18. A device for selectively compensating for the chromatic dispersion of optical signals according to claim 17, characterized in that said first and second optical switches are included in an acousto-optical device.

19. A method of selectively compensating for the chromatic dispersion of optical signals in an optical telecommunication network comprising the steps:

transmitting at least two signals over a common portion of said network;

detecting the chromatic dispersion of each of said signals at at least a first point of said network;

identifying, among those detected signals, the signals having the detected dispersion value which does not fall within a range of predetermined values as the signals to be compensated;

separating at least one of said identified signals from the remaining signals at at least a second point of said network;

compensating for the chromatic dispersion of said separated signal so that the dispersion of said separated signal is included within said range of predetermined values; and recombining said compensated signal with the remaining signals at said second point of said network.

20. The method of claim 19, wherein said step of detecting the chromatic dispersion comprises:

identifying the optical path of each of said signals; and determining the chromatic dispersion associated with each path.

21. The method of claim 19, wherein said step of detecting the chromatic dispersion comprises measuring the chromatic dispersion of each of said signals close to said first point in the network.

22. The method of claim 19, wherein said step of compensating for the chromatic dispersion comprises switching the path of said separated signal to be compensated so that said path will comprise a dispersion compensator.

23. A method of selectively compensating for the chromatic dispersion of optical signals in an optical telecommunication network comprising the steps:

transmitting at least two time-division multiplexed signals over a common portion of said network;

separating at least one of said signals from the remaining signals at at least one point of said network;

compensating for the chromatic dispersion of said separated signal; and recombining said compensated signal with the remaining signals at said one point of said network.

* * * * *